(No Model.)  H. H. GARRETT.  2 Sheets—Sheet 1.

GAS FURNACE.

No. 329,827. Patented Nov. 3, 1885.

WITNESSES:
J. Snowden Bell.
R. H. Whittlesey

INVENTOR
Henry H. Garrett
by George H. Christy
ATTORNEY (No Model.) 2 Sheets—Sheet 2.

H. H. GARRETT.
GAS FURNACE.

No. 329,827. Patented Nov. 3, 1885.

WITNESSES:
J. Snowden Bell.
R. H. Whittlesey

INVENTOR
Henry H. Garrett,
by George H. Christy
ATTORNEY

United States Patent Office.

HENRY H. GARRETT, OF PITTSBURG, PENNSYLVANIA.

GAS-FURNACE.

SPECIFICATION forming part of Letters Patent No. 329,827, dated November 3, 1885.

Application filed July 10, 1885. Serial No. 171,182. (No model.)

*To all whom it may concern:*

Be it known that I, HENRY H. GARRETT, residing at Pittsburg, in the county of Allegheny and State of Pennsylvania, a citizen of the United States, have invented or discovered certain new and useful Improvements in Gas Furnaces for Metals and Ores, of which improvements the following is a specification.

Figure 1:
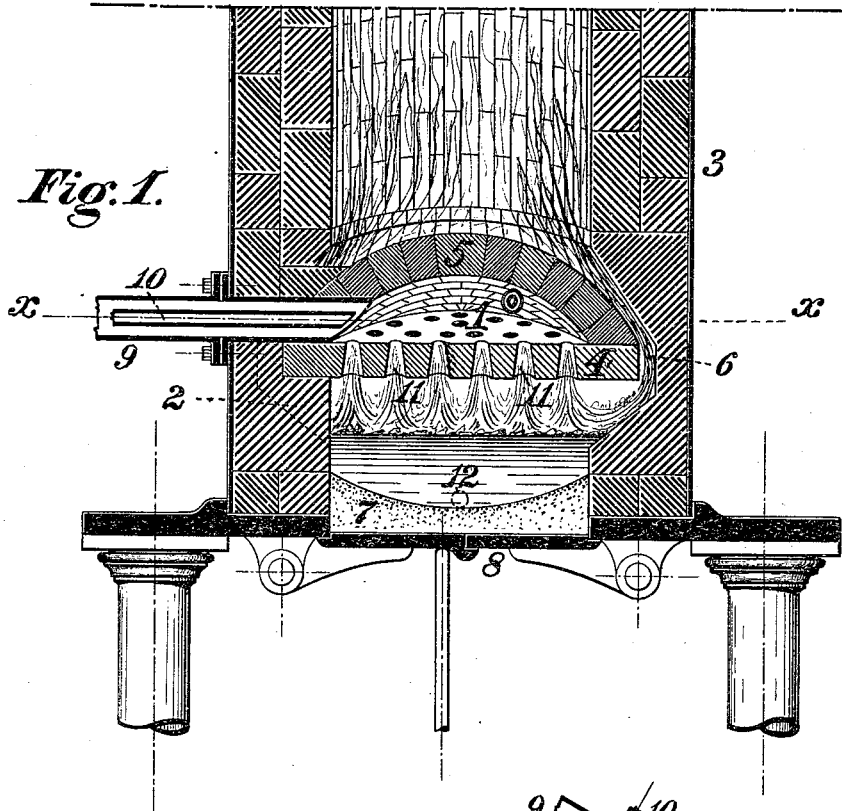
Figure 2:
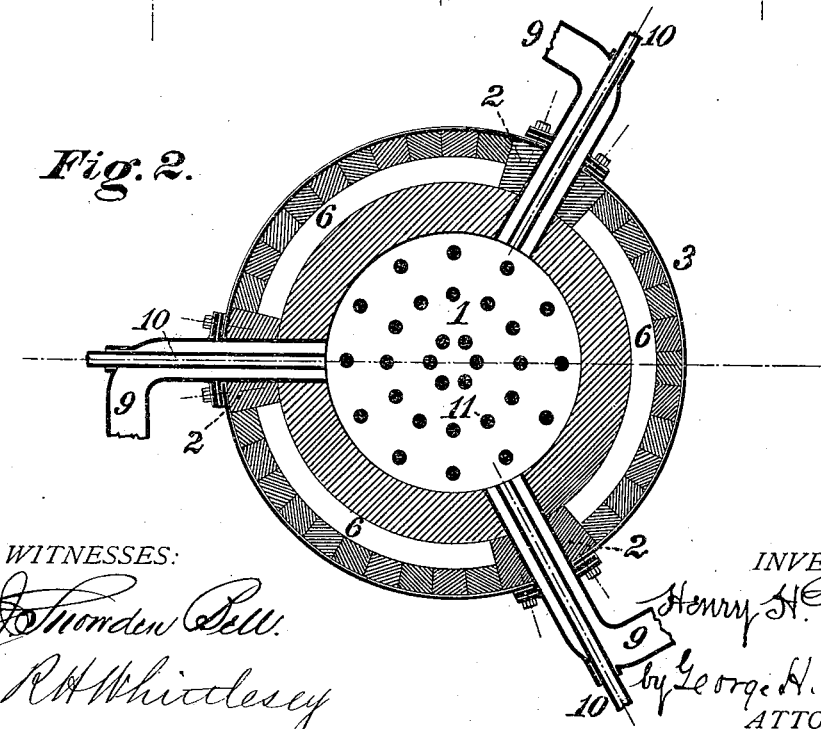
Figure 3:
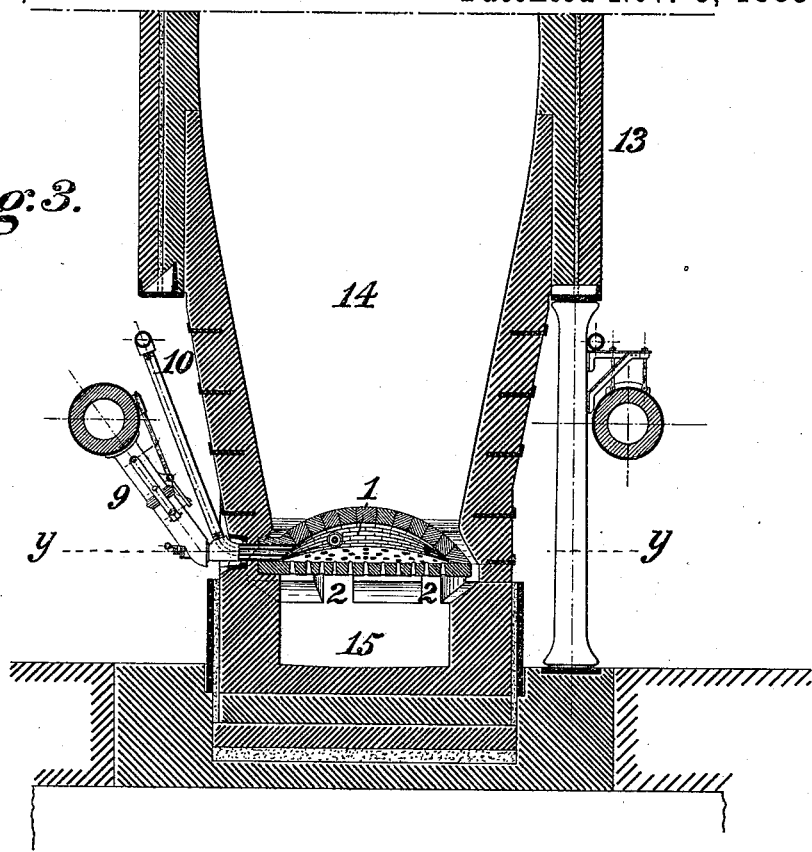

In the accompanying drawings, which make part of this specification, Figure 1 is a vertical central section through the lower portion of a cupola-furnace embodying my invention; Fig. 2, a longitudinal section through the same at the line $x\ x$ of Fig. 1; Fig. 3, a vertical central section through the boshes and crucible of a blast-furnace illustrating the application of my invention; and Fig. 4, a horizontal section through the same at the line $y\ y$ of Fig. 3.

The object of my invention is to afford effective and desirable means for the utilization of gaseous fuel in the smelting of metals and ores; to which end my invention, generally stated, consists in the combination, with a furnace, of a chamber adapted to serve as a support for the material to be fused, a series of air-blast pipes and gas-supply pipes leading into said chamber, a series of piers supporting said chamber above a lower space in the furnace, and a series of burner-passages through which mingled gas and air are delivered from said chamber to the space within the furnace below said chamber.

The improvements claimed are hereinafter fully set forth.

In the practice of my invention I provide a chamber, 1, of fire-brick or other similar refractory material, which is supported by a series of fire-brick piers, 2, in the lower portion of a furnace of any suitable construction.

Referring to Figs. 1 and 2, in which my invention is shown as applied in an ordinary cupola-furnace, 3, the chamber 1 is included between a circular floor, 4, and a continuous or imperforate arched roof or crown, 5, sprung upon said floor and rising from the periphery thereof. The crown 5 forms the bed or support of the pig metal charged into the cupola, and the outer diameter of the chamber is less than the adjacent inner diameter of the cupola, so as to form a series of segmental passages, 6, around the chamber, through which the molten metal passes to the receptacle formed by the space below the chamber 1 at the bottom of the cupola, resting upon the sand bed 7, which covers the drop-bottom 8. A series of air-blast pipes or tuyeres, 9, to which air under pressure is supplied by a suitable fan or blower in the usual manner, is led into the chamber 1, said tuyeres passing through and being supported and protected by the piers 2. A gas-supply pipe, 10, through which gas is conveyed from a well or main, a gas-generator or other source of supply of gas, either natural or manufactured, is led into each of the tuyeres 9, its discharge-opening being located adjacent to that of the tuyere, so that the gas passing from the supply-pipes 10 is surrounded by and mingles thoroughly with the air entering the chamber 1 through the tuyeres inclosing said pipes. A series of burner-passages, 11, is formed in the floor 4 of the chamber for the escape of the mingled gas and air into the furnace, the gas being ignited at the outer ends of said passages. The chamber 1 thus serves both as the support for the charge of the furnace and as a compartment for mixing the gas and air, which are supplied in properly-regulated relative volumes. The combustion maintained below and around the chamber 1 heats the same to a high degree and effects the fusion of the metal resting thereon, which passes down through the passages 6 to the receptacle formed by the space below the chamber 1, at the bottom of the cupola, from which it is withdrawn through the tap-hole 12 from time to time, as required, being maintained in a proper condition of fluidity by the direct action of the heat of the gas escaping and impinging upon it from the burner-passages 11 in the floor of the superposed chamber 1. It will be seen that an intense and uniform heat can be applied to the charge of metal with a regularity and certainty which are not practicable under the conditions of use of solid fuel, and the construction and location of the supporting and mixing chamber and its accessories are such that it may be readily applied at comparatively small cost to furnaces of any of the usual types.

Figure 4:
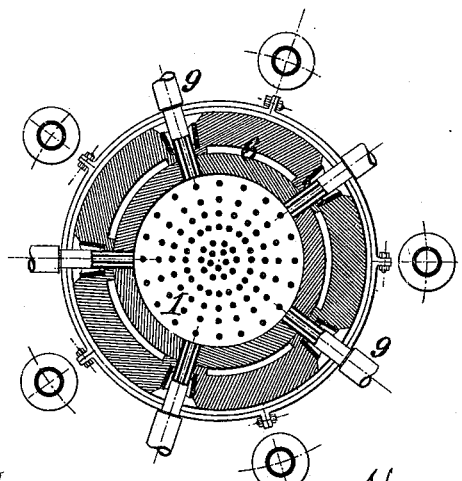

In the application of my improvements to a blast-furnace, 13, as shown in Figs. 3 and 4, the chamber 1 is located at or near the junction of the boshes 14 and crucible 15, and is supported upon piers 2 above the hearth or bottom of the crucible and provided with tuyeres 9 and gas-supply pipes 10, as before described.

It will be obvious that by suitable changes of form and dimensions involving no departure from the spirit of my invention the same may be applied in furnaces for the treatment of metals and ores by heat of constructions other than those which have been selected for illustration.

I am aware that a combustion-chamber located within a furnace and serving to support a charge of metal or ore therein has been heretofore known, and such, therefore, I do not broadly claim. So far, however, as my knowledge and information extend, the discharge of the heated gases has in prior constructions been effected only upwardly and through the sides of the chambers, and provision has not been made for their impingement and direct action upon the molten metal, as in my invention.

I claim herein as my invention—

1. The combination, with a furnace, of a chamber having a roof or crown adapted to serve as the support of a charge of metal or ore, and a series of burner-passages in its floor or base, a series of piers supporting said chamber above a space or receptacle for molten metal at the bottom of the furnace, and a series of tuyeres or air-blast pipes, each inclosing a gas-supply pipe, which discharges into the chamber adjacent to the discharge end of the tuyeres therein, substantially as set forth.

2. The combination, with a furnace, of a chamber having a roof or crown adapted to serve as the support of a charge of metal or ore, and a series of burner-passages in its floor or base, a series of piers supporting said chamber above a space or receptacle for molten metal at the bottom of the furnace, a series of passages separating the chamber from the inner walls of the furnace, and a series of air-blast pipes and gas-supply pipes passing through the supporting-piers and discharging into the chamber, substantially as set forth.

3. A chamber for supporting a charge of metal or ore in a furnace and effecting the mixture of a supply of gas and air, said chamber being composed of refractory material and having an arched or dome-shaped roof or crown, and a floor or base perforated with a series of burner-passages, substantially as set forth.

In testimony whereof I have hereunto set my hand.

HENRY H. GARRETT.

Witnesses:
J. SNOWDEN BELL,
R. H. WHITTLESEY.